United States Patent
Manninen (10) Patent No.: US 9,829,110 B2
(45) Date of Patent: Nov. 28, 2017

(54) SLIDE RING, A SHAFT, A MECHANICAL SEAL, A HOUSING AND A ROTOR FOR A FLOW MACHINE AND A FLOW MACHINE

(71) Applicant: SULZER MANAGEMENT AG, Winterthur (CH)

(72) Inventor: Heikki Manninen, Mantta (FI)

(73) Assignee: SULZER MANAGEMENT AG, Winterthur (CH)

( * ) Notice: Subject to any disclaimer, the term of this patent is extended or adjusted under 35 U.S.C. 154(b) by 0 days.

(21) Appl. No.: 14/761,284

(22) PCT Filed: Jan. 22, 2014

(86) PCT No.: PCT/EP2014/051172
§ 371 (c)(1),
(2) Date: Jul. 15, 2015

(87) PCT Pub. No.: WO2014/122015
PCT Pub. Date: Aug. 14, 2014

(65) Prior Publication Data
US 2015/0362076 A1 Dec. 17, 2015

(30) Foreign Application Priority Data
Feb. 8, 2013 (EP) ..................................... 13154514

(51) Int. Cl.
F16J 15/34 (2006.01)
(52) U.S. Cl.
CPC ....... *F16J 15/3452* (2013.01); *F16J 15/3464* (2013.01); *F16J 15/3484* (2013.01)
(58) Field of Classification Search
CPC ........ F16J 15/34; F16J 15/3464; F16J 15/348; F16J 15/3484
See application file for complete search history.

(56) References Cited

U.S. PATENT DOCUMENTS 2,272,526 A 2/1942 Keeran
3,001,807 A 9/1961 Amirault et al.
(Continued)

FOREIGN PATENT DOCUMENTS

CN 2072620 U 3/1991
CN 2141488 Y 9/1993
(Continued)

OTHER PUBLICATIONS

International Search Report in PCT/EP2014/051172 dated May 8, 2014.
(Continued)

*Primary Examiner* — Gilbert Y Lee
(74) *Attorney, Agent, or Firm* — Global IP Counselors, LLP (57) ABSTRACT

A mechanical seal includes a pair of slide rings and a spring. Each slide ring has an outer circumferential surface, an inner circumferential surface and slide or seal surfaces at one axial end. Each pair of slide rings has a rotating slide ring and a stationary slide ring, the slide or seal surfaces of each pair of slide rings being in sliding and sealing contact with each other. The inner circumferential surface of one rotating slide ring includes a device to form lock the slide ring, by direct mechanical contact to a hub or a shaft of the flow machine and at least one sealing surface at a side of the device is configured to form lock, each of the slide rings, when assembled to the flow machine supported, in an axial direction by a seal ring to one of the hub and the shaft of the flow machine.

22 Claims, 8 Drawing Sheets (A - A)

(56) References Cited

U.S. PATENT DOCUMENTS

| | | | | |
|---|---|---|---|---|
| 4,586,719 A * | 5/1986 | Marsi | ................... | F04D 29/126 |
| | | | | 277/361 |
| 2013/0011256 A1 | 1/2013 | Holzapfel et al. | | |
| 2014/0027985 A1* | 1/2014 | Mateman | .............. | F04D 29/122 |
| | | | | 277/412 |

FOREIGN PATENT DOCUMENTS

| | | |
|---|---|---|
| CN | 2809286 Y | 8/2006 |
| CN | 2897446 Y | 5/2007 |
| DE | 20212246 U1 | 10/2002 |
| DE | 202010000954 U1 | 6/2010 |
| FR | 2307203 A1 | 11/1976 |
| JP | S63-177361 U | 11/1988 |

OTHER PUBLICATIONS

Chinese Office Action and Search Report dated May 4, 2016 in CN Patent Application No. 20140006015.7 (English Translation only).

* cited by examiner

SLIDE RING, A SHAFT, A MECHANICAL SEAL, A HOUSING AND A ROTOR FOR A FLOW MACHINE AND A FLOW MACHINE

CROSS-REFERENCE TO RELATED APPLICATIONS

This application is a U.S. National stage application of International Application No. PCT/EP2014/051172, filed Jan. 22, 2014, which claims priority to EP Application No. 13154514.7 filed on Feb. 8, 2013, the contents of each of which is hereby incorporated herein by reference.

BACKGROUND

Field of the Invention

The present invention relates to a new kind of a slide ring and a mechanical seal, a so called slide ring seal used, for example, for sealing a shaft space of a centrifugal pump in relation to a pumping space thereof. The present invention also relates to coupling said mechanical seal to a housing, to a shaft and to a rotor of a flow machine. Therefore, the present invention also relates to the shaft, the housing and the rotor of the flow machine.

In the following description of prior art and the present invention, a centrifugal pump has been used as an example of a flow machine, and an impeller as an example of a rotor of a flow machine. However, it must be understood that the present invention may be used in connection with any flow machine i.e. any liquid treating apparatus having a rotary shaft, which needs to be sealed in such a way that the liquid to be treated is not able to flow along the shaft out of the apparatus. Thus the flow machine includes, in addition to centrifugal pumps, also other pumps as well as mixers and agitators, just to name a few alternatives.

Background Information

The prior art includes various types of seals used for sealing a shaft of a flow machine, like a gland packing, a slide ring seal and a dynamic seal. The two first mentioned seal types are based on closing the gap via which a leakage might occur, whereas the operation of the dynamic seal is based on creating a pressure difference capable of preventing the leakage. The dynamic seal is specifically designed for fibrous slurries, but also fits well for clean, viscous, non-fibrous slurries and liquids containing large solids. The dynamic seal does not need external sealing water and does not leak.

SUMMARY

The present invention is related to the first mentioned seal types. The gland packing shaft seal (FIG. 1) may be used, in certain operating conditions without any specific sealing liquid, whereby a minor leakage of the liquid to be pumped is allowed to secure the proper operation of the gland packing by lubricating the sliding surfaces of the packing rings. In certain other operating conditions, for instance when viscous, fibrous and non-fibrous slurries and liquids containing large solid particles are pumped, the gland packing requires external sealing/lubrication liquid to prevent pumped liquid from entering the sealing area.

The single mechanical seal (FIG. 2) is normally used in more demanding operating, i.e. for instance when fibrous slurries up to 8% consistency are pumped. The seal may be used without flushing water when pump suction head is positive and the impeller is equipped with specific balancing holes. Naturally, single mechanical seal is also suitable for use with clean and viscous liquids and liquids containing large solids.

Double mechanical seal (FIG. 3) applies to most demanding operating conditions, i.e. it may be used for pumping liquids and suspension in all consistencies and concentrations. In other words, pumping of clean, viscous, fibrous slurries, non-fibrous slurries and liquids containing large solids may be performed. The pump suction head may be negative or positive and the impeller may be equipped with or without balancing holes.

All above mentioned and briefly described seal types may be used in all kinds of flow machines, i.e. pumps, mixers etc. In the following pumps are referred to just for the sake of simplification. The pump type and the pump structure subjects the sealing to varying demands. Pumps, whose impeller has been fastened or connected to a shaft of an electric drive motor, set particularly high demands to the sealing. Such pumps have, the impeller and its shaft supported on the bearings of the drive motor, whereby the impeller is hanging relatively far from the support bearings. This means, in practice, that the shaft of the centrifugal pump that carries the impeller bends due to hydraulic radial forces, especially outside the best operating point of the pump. Now that the pump housing equipped with at least parts of the sealing is fixedly mounted to the end flange or to the housing of the drive motor, there is certain movement between the shaft and the pump housing, as the pump housing does not bend at all or, in the least, not in the same magnitude as the shaft. The radial movement of the shaft in relation to the parts of the sealing fixed to the pump housing easily subjects the sealing, for various reasons, to increased wear shortening the lifetime of the sealing.

Very often centrifugal pumps include a space for a gland packing for two reasons. Firstly, the gland packing is the cheapest way of sealing a pump. And secondly the gland packing requires more space, especially in axial direction, than the mechanical seals. In other words, a gland packing of sufficient size (length) cannot fit into a space optimal for a mechanical seal. Therefore pumps manufactured in large more or less standardized series include a sealing cavity capable of housing the seal requiring the largest space, i.e. the gland packing. This means that even if the same pump is used in more demanding environment where either single or double mechanical seals are used, the mechanical seal is adapted to the space reserved for the gland packing. It is easy to understand that the length requirement of a gland packing makes the above problem relating to the bending of the shaft, and the resulting wear of the seals even worse.

Another problem resulting from a lengthy shaft due to the excess length of the sealing is an increased clearance between the impeller and the volute/wear plate. When designing the pump and its running clearances the worst possible operating conditions have to be taken into account, whereby, since there is a potential risk of bending of the shaft, the clearance between the impeller and the volute/wear plate has to be increased in order to avoid mechanical contact between the volute/wear plate and the working vanes of the impeller. As a result the increased clearance increases leak losses and reduces the total efficiency of the pump.

Figure 2:
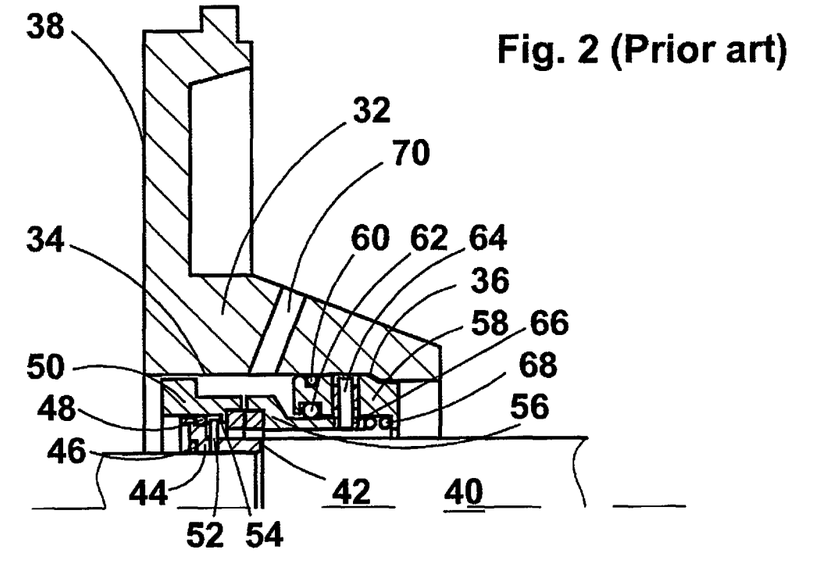
FIG. 2 illustrates schematically a prior art single mechanical seal in connection with a housing of a centrifugal pump.

A further problem may be seen in the structure of the mechanical sealing when the bending of the shaft has to be taken into account. Now that the rotating ring of the mechanical sealing is clamped, as it is normally done, between the impeller and a shoulder on the shaft in place of a shaft sleeve of a gland packing sheltering the shaft from wear, and that the stationary slide ring is fixed to the pump housing, the bending of the shaft causes the slide surfaces to get misaligned, i.e. they have a small angular difference in their orientation. Such a misalignment subjects the slide surfaces to dynamic axial force that tends to distort the slide surfaces. Since such a distortion causes excessive wear and premature leaking of the sealing the misalignment has to be avoided. It is traditionally done by forming the rotating part of the slide ring seal of two parts connected by, for instance, drive pins to one another. This makes the construction of the slide ring seal complicated and the slide ring seal itself expensive. FIG. 2 discusses in more detail the single mechanical slide ring seal that is comprised of two functional main parts and a number of additional components required by the present state of the art construction.

A yet further problem may be seen in the common practice of fastening the stationary separate body of the slide ring seal to the space for a gland packing or to a corresponding space by a flange or screws or headless bolts, which makes the construction of the slide ring seal even more complicated and the slide ring seal itself even more expensive.

Figure 3:
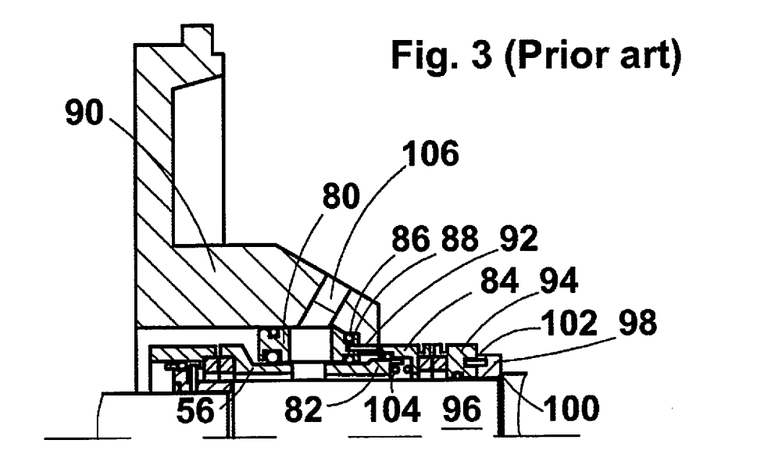
FIG. 3 illustrates schematically a prior art double mechanical seal in connection with a housing of a centrifugal pump.

A still further problem may be found in the use of a double mechanical seal. Now that the rotating ring at the atmosphere side of the double mechanical seal is fastened on the shaft by locking screws, as it is normally done, and that the stationary slide ring is fixed to the pump housing, the bending of the shaft causes the slide surfaces to get misaligned, i.e. they have a small angular difference in their orientation. Such a misalignment subjects the slide surfaces to dynamic axial force that tends to distort the slide surfaces. Another reason why the rotating slide surface is deformed/distorted is the tension the locking screws subject to the slide ring. Since such a distortion causes excessive wear and premature leaking of the sealing the misalignment/distortion has to be avoided. It is traditionally done by forming the rotating part of the slide ring seal at the atmosphere side of two parts. This makes the construction of the slide ring seal complicated and the slide ring seal itself expensive. FIG. 3 discusses in more detail the double mechanical slide ring seal having the atmosphere side rotating slide ring made of two main parts.

An object of the present invention is to eliminate at least one of the above mentioned problems by a novel sealing structure.

Another object of the present invention is to develop a novel mechanical seal that may be used in place of traditional gland packings, and single as well as double mechanical seals.

A further object of the present invention is to design a novel mechanical seal that is integrated into the construction of the pump housing.

A still further object of the present invention is to design a novel mechanical seal that is short by nature and therefore allows the shortening of the shaft of a centrifugal pump.

A yet further object of the present invention is to design a novel shaft, housing and rotor for a flow machine capable of utilizing the mechanical seal of the present invention.

A yet another object of the present invention is to design a novel mechanical seal for a flow machine that is able to take into account the bending of the shaft such that the seal surfaces remain properly aligned in spite of the bending of the shaft.

The features of the mechanical seal and the flow machine in accordance with the present invention become apparent from the appended claims.

The present invention brings about a number of advantages, like for instance

Simple construction of a mechanical seal,
Cost efficient construction,
Smaller number of components, quicker assembly,
No specific stationary body part needed,
A multi-purpose seal that may be used in all possible operating conditions of a flow machine,
Easy to switch from internal lubrication to external lubrication, no changes required in the seal construction,
Shorter shaft, less bending, less stress,
Shorter pump housing or adapter to connect the pump housing with the drive motor,
May be used to replace gland packing type seals or to simplify the construction of single and double mechanicals seals,
No risk of breakage of the drive pins,
The axial length of the mechanical seal is substantially equal to the diameter of the shaft to be sealed or smaller (earlier 2-3 times the diameter),
Easy to control the running clearances of the impeller and the parts of the mechanical seal itself,
Smaller temperature based changes in various clearances both in the flow machine and in the mechanical seal,
Improved efficiency of the flow machine, and
Due to the simple construction and, as a consequence, low price level of the double mechanical seal of the invention the double mechanical seal may be used in all sealing applications without a need to consider the type of the seal in detail.

BRIEF DESCRIPTION OF THE DRAWINGS

The mechanical seal and the flow machine of the present invention are described more in detail below, with reference to the accompanying drawings, of which

DETAILED DESCRIPTION OF THE EMBODIMENTS

Figure 1:
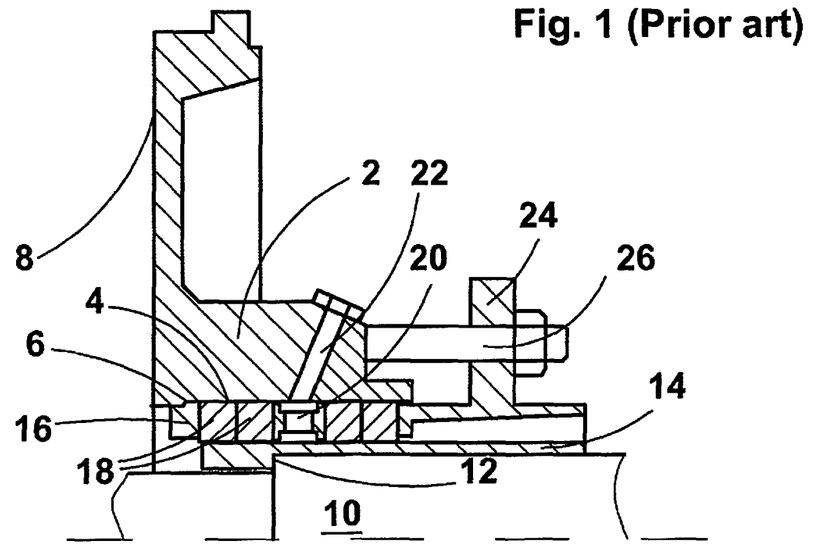
FIG. 1 illustrates schematically a prior art gland packing type shaft seal in connection with a housing of a centrifugal pump.

FIG. 1 illustrates schematically an exemplary prior art gland packing type shaft seal. The centrifugal pump housing 2 includes a bore 4 for the shaft of the pump the bore 4 having a shoulder 6 near the back wall 8 of the housing 2. The shaft 10 of the pump includes a shoulder 12 against which a protective sleeve 14 is clamped by an impeller when fastening the centrifugal impeller (not shown) on the shaft. The sleeve 14 shelters the shaft 10 from mechanical wear. A bottom ring 16 rests against the shoulder 6 of the bore 4 and the packing rings 18 are stacked one after another on the bottom ring 16 in the space between the pump housing 2 and the protective sleeve 14. The stack of packing rings 18 include, in this particular case, an intermediate ring 20 at about the center of the stack of the packing rings 18. The purpose of the ring 20 is to allow sealing and lubrication liquid to enter the contact area between the packing rings 18 and the sleeve 14 from conduit 22. The packing rings 18 are held under pressure in the stack by a gland 24, the position of which is adjustable by bolts 26 screwed in holes in the pump housing 2. The axial dimension of a gland packing is considerable as both the packing rings itself, the intermediate ring, the gland and the bolts require space in axial direction.

FIG. 2 illustrates schematically an example of a single mechanical shaft seal. The exemplary seal of FIG. 2 is already an improvement over the conventional way of arranging a mechanical seal, i.e. assembling the mechanical seal directly into the space designed for a gland packing. In other words, now the pump housing 32 includes a bore 34 for the shaft the bore having a shoulder 36 at the end of the bore 34 opposite to the back wall 38 of the pump. This means, in practice, that the assembly and maintenance of the sealing takes place vie the volute end of the housing, not the drive end as in connection with the packing seal of FIG. 1. The shaft 40 of the pump includes a shoulder 42 against which a rotating adapter ring 44 is arranged. In practice the rotating adapter ring 44 is clamped in its place by the impeller of the pump while the impeller is fastened on the shaft. An O-ring seal 46 prevents liquid from entering between the shaft 40 and the rotating adapter ring 44, and an O-ring 48 arranged at the outer circumferential surface of the rotating adapter ring 44 prevents the liquid from entering between the rotating slide ring 50 and the adapter ring 44. The rotation of the rotating slide ring 50 with the shaft is not left for the O-rings 46 to ensure, but at least one drive pin 52 is arranged in at least one radial hole in the rotating adapter ring 44 such that it extends radially into at least one corresponding substantially axial groove 54 in the inner circumferential surface of the rotating slide ring 50.

The stationary slide ring 56 is supported to the pump housing 32 by a stationary adapter ring 58, which is sealed by O-rings 60 and 62 with regard to the pump housing 32 and the stationary slide ring 56, respectively. The stationary adapter ring 58 is fastened non-rotatably to the bore by one or more screws or drive pins, for instance. The rotation of the stationary slide ring 56 is prevented by at least one drive pin 64 extending from the stationary adapter ring 58 radially inwards into an axially oblong opening 66 in the stationary slide ring 56. The opening 66 has an oblong configuration for allowing axial movement of the stationary slide ring 56. Appropriate compression between the sealing surfaces of the slide rings 50 and 56 is ensured by a spring 68 urging the stationary slide ring 56 towards the rotating slide ring 50. The pump housing 32 may include a bore 70 for introducing flushing liquid to the sealing if desired.

Like the above description and FIG. 2 show the single mechanical seal has, in addition to the functionally necessary components, i.e. slide rings 50 and 56, spring 68 and the O-rings, two adapter rings 44 and 58 and at least two, possibly several drive pins 52 and 64, which raise considerably the manufacturing costs of a single mechanicals seal. Additionally, in the installation stage of a mechanical seal they increase work and chance of mistakes in the assembly.

FIG. 3 illustrates schematically an example of a prior art double mechanical shaft seal. The exemplary seal of FIG. 3 is already an improvement over the conventional way of arranging a mechanical seal, i.e. assembling the mechanical seal directly into the space designed for a gland packing. The left hand side or the impeller/volute side or the product side half of the double mechanical shaft seal is similar to that discussed in FIG. 2 up to the stationary adapter ring 80, whereby its structure is not discussed in detail.

Now that it is a question of a double mechanical seal the stationary adapter ring 80 supports, not only the stationary left hand side slide ring 56, but the part of the slide ring 56 that acts as the carrier ring 82 of the right hand side stationary slide ring 84. The slide/carrier ring 56/82 is arranged non-rotatably in relation to the adapter ring 80 by drive pin/s (now shown). The stationary adapter ring 80 is sealed by O-rings 86 and 88 to both the pump housing 90 and the carrier ring 82 of the stationary slide ring 84, respectively. The rotation of the stationary adapter ring 80 is prevented by at least one drive pin 92 or screw. The right hand side or atmosphere side rotating slide ring 94 is supported on the shaft 96 by a rotating adapter ring 98 that rests against a shoulder 100 on the shaft 96. The rotation of the slide ring 94 is ensured by drive pin/s 102 between the rotating slide ring 94 and the adapter ring 98. The pressure between the sealing surface of both pairs of slide rings is ensured by spring 104 urging the stationary right hand or atmosphere side slide ring 84 against the rotating slide ring 94 and simultaneously the stationary carrier ring 82 to the left such that also the left hand side stationary slide ring 56 is pressed to the left against the rotating slide ring. The connection between the carrier ring 82 and the slide ring 56 has not been shown. However, optionally the carrier ring 82 and the slide ring 56 are of unitary construction. Additionally the pump housing 90 includes a channel 106 for bringing flushing liquid to the mechanical sealing, for which purpose the stationary adapter ring 80 includes openings that allow the liquid to enter between the shaft 96 and the pairs of mechanical slide rings.

As it appears from the earlier description and the attached drawings and their description, the both the single and double mechanical seals of prior art have a number of additional components in addition to the necessary ones, i.e. the slide rings and springs. It is easy to understand that each additional component adds the manufacturing costs of the sealing. It is also true that the assembly of numerous components open a risk to mistakes in the assembly. The small size of the components adds the risk. Also, it has been seen that the prior art mechanical seals fail, as the drive pin or pins break and the stationary slide ring or adapter ring starts to rotate or a rotating slide ring stops rotating gradually. In such a case there is a great risk that not only components of the seal itself get damaged, but also the pump housing and/or the shaft starts to wear. In the worst case, after a leak has been detected, not only the mechanical seal, but also the pump housing and/or the shaft of the pump have to be replaced or repaired.

Figure 4:
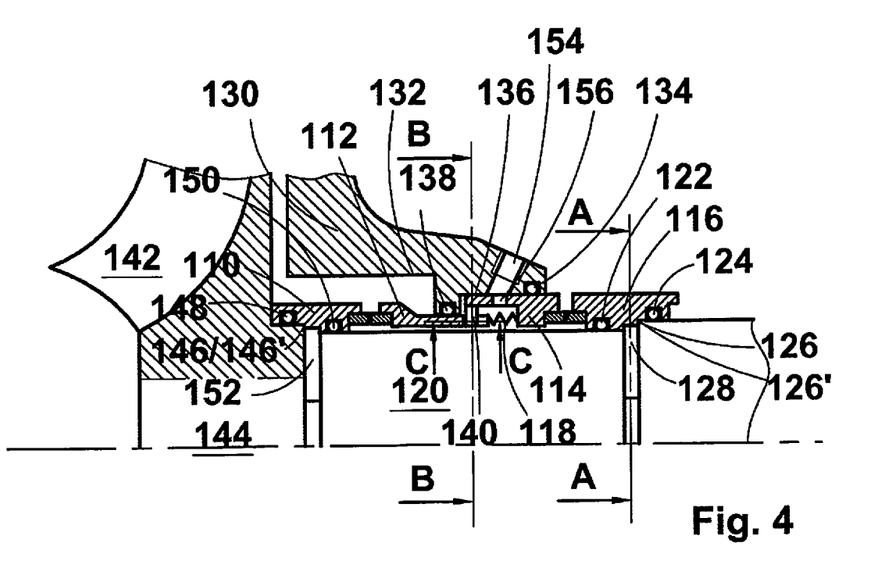
FIG. 4 illustrates schematically a double mechanical seal in accordance with a first preferred embodiment of the present invention.

FIG. 4 illustrates schematically a double mechanical seal in accordance with a first preferred embodiment of the present invention. In an optimal case, discussed in FIG. 4, the mechanical seal comprises five components, if the O-rings or corresponding secondary seal members are not counted. In other words, the mechanical seal of this embodiment is formed of a first rotating slide ring 110, a first stationary slide ring 112, a second stationary slide ring 114, a second rotating slide ring 116, and a spring 118 pushing the stationary slide rings 112 and 114 apart, i.e. towards the rotating slide rings 110 and 116. Thus the mechanical seal of the invention comprises only such components that have a clear effect or function in the sealing operation.

The second rotating slide ring 116 is rotationally symmetric, and at the atmosphere side of the sealing, supported on its support, i.e. on the shaft 120 by two seal rings 122 and 124 (preferably, but not necessarily O-rings) arranged at the inner circumferential surface of the slide rings such that the second rotating slide ring 116 is floating on the seal rings 122 and 124. The second rotating slide ring 116 comprises, like the other slide rings of the present invention, the actual sliding sealing member and the ring body though the slide ring may be manufactured of the sliding sealing member material entirely. The slide ring 116 has at its inner circumferential surface an inwardly extending shoulder 126 that rests against a shoulder 126' on the shaft 120. The shoulder area, i.e. the area in close axial proximity of the shoulders 126 and 126' is disposed at the inner circumferential surface of the slide ring with means or device 128 for coupling the second rotating slide ring 116 with the shaft 120 such that the slide ring 116 rotates with the shaft 120. The coupling is based on form-locking the slide ring 116 on the shaft 120, and has been discussed in more detail in connection with FIGS. 5a and 5b. The shoulder area may also be called a coupling area or a form-locking area. It should be understood here that shoulder 126' on the shaft against which the slide ring 116 rests may be on either side of the coupling or the form-locking means 128, i.e. on the side of the smaller shaft diameter or on the side of the larger shaft diameter. As to the coupling means on the shaft, in accordance with a preferred, but not necessary, alternative the coupling or the form-locking means are arranged on or in a substantially cylindrical, i.e. axially and circumferentially extending surface whereby the coupling or the form-locking means itself does not subject the slide ring to any axial force. However, the coupling, i.e. the form locking between the slide ring and the shaft may be arranged in any other appropriate manner.

The slide ring 116 may also be supported on the shaft by a slightly simpler means, i.e. in some cases the use of a single seal ring, i.e. the O-ring 124, at the inner circumferential surface of the slide ring is needed. The purpose of the single seal ring 124 is to prevent dirt from atmosphere from entering the form-locking means 128, i.e. the small gaps between the slide ring 116 and the shaft 120. The impurities entering to the form-locking means may form with the seal/lubricating liquid a paste like medium that easily fills the gaps and may result in the form-locking means getting stuck together making it more difficult to service the seal, i.e. remove the slide ring 116 from the shaft 120. As to the positioning of the seal rings 124 (and 122, if used) it/they may be arranged in a groove/grooves in the inner circumferential surface of the slide ring 116, but it/they may as well be arranged in a corresponding groove/grooves in the shaft 120, whereby the inner circumferential surface of the slide ring only includes a sealing surface for the seal ring at a side of the form-locking means 128.

The second stationary slide ring 114 is sealed within the pump housing 130 to the bore 132 for the shaft 120 by a seal ring 134 (preferably, but not necessarily an O-ring) at the outer circumferential surface of the slide ring 114. The coupling, i.e. the form-locking 136 between the second stationary seal ring 114 and its support, i.e. the pump housing, securing the non-rotating feature of the stationary slide ring 114 is discussed in more detail in connection with FIG. 7.

The first stationary slide ring 112 is sealed within the pump housing 130 to the bore 132 by a seal ring 138 (preferably, but not necessarily an O-ring) arranged at the outer circumferential surface of the slide ring 112. It is also coupled with the second stationary slide ring 114 by at least one pin 140 extending radially inwardly from the second stationary slide ring 114 and fitting in at least one corresponding opening arranged in the first stationary slide ring 112. Preferably, but not necessarily, there are two pins arranged on the opposite sides of the second stationary slide ring 114, and two openings in the first stationary slide ring 112 positioned in a corresponding manner opposite to one another. The coupling has been explained in more detail in connection with FIG. 6. The above discussed coupling has a dual function. Firstly and most importantly, it keeps the first stationary slide ring 112 in physical communication with the second stationary slide ring 114 such that as the second stationary slide ring 114 is not able to rotate, neither does the first one 112. Secondly, the coupling shown in FIG. 6 makes it possible to lock, if desired (not always necessary), the first stationary slide ring 112 together with the spring 118 as one package with the second stationary slide ring 114. This makes the assembly of the first rotating slide ring 110 together with the impeller 142 easier, as the spring 118 is not able to push the first rotating slide ring 112 out of contact with the seal ring 138. However, it is also possible to design the stationary slide rings and the spring such that the spring does not push the inner stationary slide ring entirely out of the outer slide ring. In other words, the free length of the spring is chosen such that when the spring is freely between the stationary slide rings the inner slide ring is still within the outer slide ring for a certain distance. Yet another way to keep the stationary slide rings and the spring as one package is to arrange the spring to be easily attached to the stationary slide rings.

However, here it has to be understood that the locking of the stationary slide rings 112 and 114 to one another may be performed by some other suitable means. Also it has to be understood that such a locking of the stationary slide rings together is not always necessary, but the first stationary slide ring 112 may be coupled non-rotatably with the pump housing 130 to the bore 132 with similar means as the second one, whereby both stationary slide rings are directly and independent from each other coupled non-rotatably with the pump housing. Also it is possible that it is the first stationary slide ring that is coupled non-rotatably with the pump housing, and the second stationary slide ring is coupled non-rotatably with the first one. In the last option, the mutual locking of the slide rings may also be arranged, if desired, in a similar manner as discussed above, i.e. by form-locking, or by some other appropriate means.

The first rotating slide ring 110 is rotationally symmetric and disposed at its inner circumferential surface with an internally extending substantially radial shoulder 146 for resting against a complementing surface i.e. shoulder 146' on outer circumference of the hub 144 of the impeller 142. The first rotating slide ring 110 is supported on its support, which is not only formed of the shaft 120, but also of the hub 144 of the impeller 142, against a shoulder 146' thereon. The first rotating slide ring 110 is at its inner circumferential surface sealed to the hub 144 by a seal ring 148 (preferably, but not necessarily an O-ring) and to the shaft 120 by a seal ring 150 (preferably, but not necessarily an O-ring) such that the first rotating slide ring 110 is floating on the seal rings. The coupling 152 between the hub 144 and the first rotating slide ring 110 is preferably similar to the one those discussed in FIGS. 5a, 5b and 7, i.e. based on form-locking at the inner circumferential surface of the slide ring. Thus the earlier discussion concerning the location of the shoulder/s in relation to the coupling applies here, too. As to the coupling or form-locking means on the hub, in accordance with a preferred, but not necessary, alternative the coupling or form-locking means are arranged on or in a substantially cylindrical, i.e. axially and circumferentially extending surface whereby the coupling or form-locking means itself does not subject the slide ring to any axial force. However, the coupling, i.e. the form locking between the slide ring and the shaft may be arranged in any other appropriate manner.

The slide ring 110 may also be supported on the shaft by a slightly simpler means, i.e. in some cases the use of a single seal ring, i.e. the O-ring 148 disposed at its inner circumferential surface is needed. The purpose of the seal ring 148 is to prevent any solids or other impurities in the liquid to be pumped from entering the form-locking means 152, i.e. the small gaps between the slide ring 110 and the shaft 120. The impurities entering to the form-locking means 152 may form a paste like medium that fills the gaps, may result in the form-locking means getting stuck together and making it more difficult to service the seal, i.e. remove the slide ring 148 from the impeller. As to the positioning of the seal ring/s 148 (and 150, if used) they may be arranged in a groove/grooves in the inner circumferential surface of the slide ring 116, as shown, but it/they may as well be arranged in a corresponding groove/grooves in the hub 144 and in the shaft 120 whereby the inner circumferential surface of the slide ring is only disposed at a side of the form-locking means 152 with a sealing surface for the seal ring.

The assembly of the mechanical seal of the present invention takes place as follows. The O-rings 122 (if used) and 124 or corresponding sealing means, like for instance lip seals, are inserted in place (preferably, but not necessarily in their respective grooves) in the second rotating slide ring 116 and the slide ring is pushed on the shaft 120 against the shoulder 126' so that the coupling or form-locking means 128 connect properly. Secondly an O-ring 134 or a corresponding sealing means is inserted in the groove, which may be located as shown in FIG. 4 in the wall of the bore 132 for the shaft in the pump housing 130 or on the outer circumferential surface of the second stationary slide ring 114. Next, the second stationary slide ring 114 is pushed in its bore 132 in the pump housing 130 such that the coupling or form-locking means 136 connect properly. Then, the spring 118 is inserted within the second stationary slide ring 114, and an O-ring 138 or a corresponding sealing means is inserted in its groove either in the wall of the bore 132 for the shaft 120 in the pump housing 130 (shown in FIG. 4) or on the outer circumferential surface of the first stationary slide ring 112, whereafter the first stationary slide ring 112 may be pushed within the second stationary slide ring 114 simultaneously compressing the spring 118. If locking means 140 are used, such are applied to lock the first and second slide rings together with the spring 118. In other words, if the locking disclosed in FIG. 4 is used the first stationary slide ring 112 is pushed within the second one 114 such that the pin/s of the second stationary slide ring 114 meet/s the openings in the first one 112. When the pin/s has/have reached the bottom of the opening the first stationary slide ring 112 is twisted whereby the pin/s lock the stationary slide rings to one another. Now the shaft 120 may be pushed inside the pump housing 130, or the pump housing 130 on the shaft 120. Next the first rotating slide ring 110 includes the O-ring/s 148 and 150 (if used) or corresponding sealing means, though the sealing means 148 could also be arranged in a groove in the hub 144 of the impeller 142. Thereafter the first rotating slide ring 110 is pushed on the hub 144 of the impeller 142 such that the coupling or form-locking means 152 connect properly. Thereafter the impeller 142 may be inserted on the shaft 120 and fastened thereon, whereby the sealing surfaces of the slide rings are compressed one against another. By properly defining the mutual positioning of the shoulder 126' on the shaft 120 and the one 146' against which the impeller is fastened on the hub 144 and the length of the spring 118 the force the compression takes place is easy to control.

FIG. 4 shows additionally a conduit 154 in the pump housing 130 and an opening 156 in the second stationary slide ring 114 for taking the flushing or lubricating liquid to the cavity between the shaft 120 and the slide rings. The conduit 154 may be connected to the pump housing or volute for taking the flushing liquid from the liquid to be pumped or to an external source of liquid if the liquid to be pumped is not suitable for use as flushing liquid.

Figure 5A:
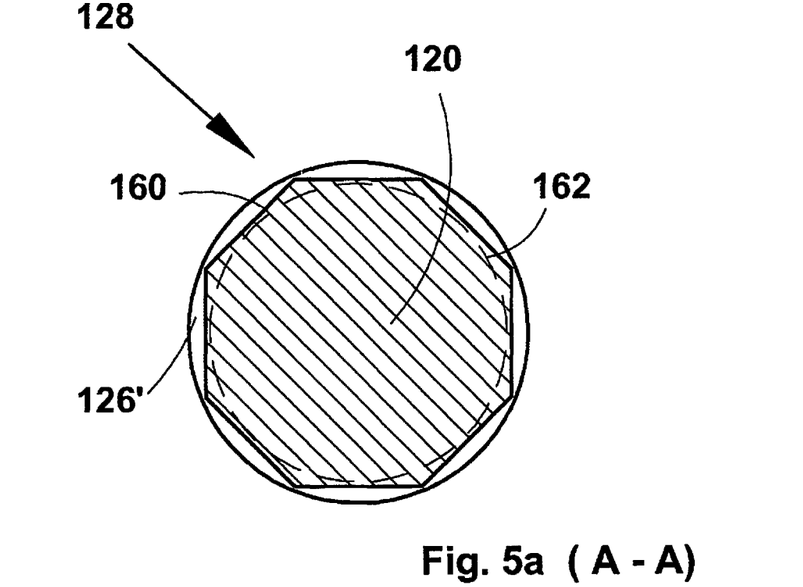
FIG. 5a illustrates schematically a first optional alternative of a cross section of the shaft of the centrifugal pump taken along line A-A of FIG. 4.

FIG. 5a illustrates schematically a first option for the coupling 128, i.e. a form locking between the shaft 120 and the second rotating slide ring as a section A-A of FIG. 4. Here it is shown that the coupling means 128 are arranged in front of the shoulder 126' on the shaft 120 against which the second rotating slide ring rests. The coupling means 128 of this embodiment is formed of a polygon having eight (though any number above two may be applied) planar surfaces 160 arranged at equal intervals on the circumferential surface of the shaft 120. In other words, the shaft 120 has, in front of the shoulder 126', or more generally at a side of the shoulder, an axial coupling area having the planar surfaces 160. The actual size or cross section of the shaft 120 in front of the coupling area has been shown by dashed circle 162. Thus, it is clear that the radius of the shaft 120, i.e. the one of the circle 162, in front of the coupling area is the same or smaller than the smallest distance from the planar surface 160 to the axis of the shaft 120. For establishing a proper coupling between the second rotating slide ring and the shaft 120 the inner circumferential surface, i.e. a certain axial length thereof, of the second rotating slide ring includes a similar configuration than that on the outer circumferential surface of the coupling area of the shaft 120.

It should also be understood that the polygon at the coupling area may be replaced with a combination of planar and circumferential surfaces. It is for instance possible to arrange only one planar surface covering a part, for instance 45 degrees, of the circumferential surface of the coupling area and leave the rest of the coupling area circumferential. Naturally there may also be two or more such planar surfaces in combination with two or more circumferential sections therebetween. Also, it should be understood that the surface deviating from the circumferential surface of the shaft at the coupling area does not necessarily have to be planar, but also curved surfaces, like convex, concave or their combinations, may be used. A viable option is a more or less constantly changing wavy surface of the shaft at the coupling area.

Figure 5B:
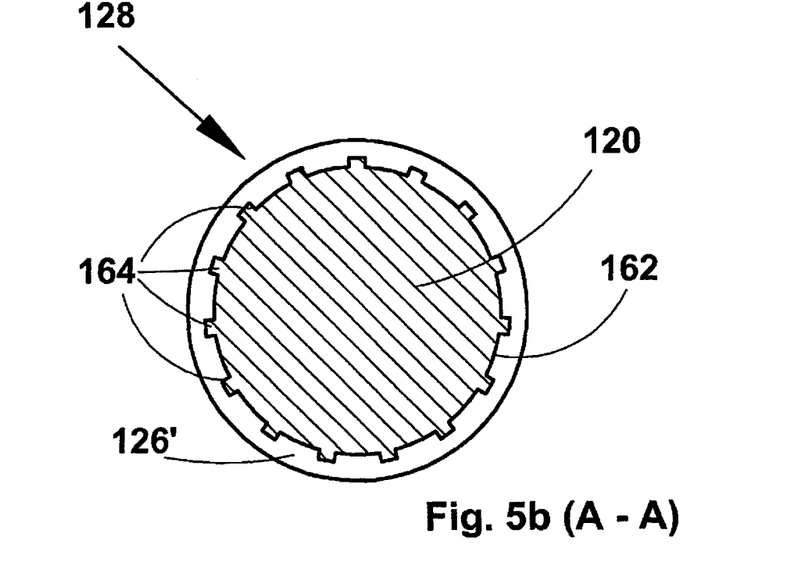
FIG. 5b illustrates schematically a second optional alternative of a cross section of the shaft of the centrifugal pump taken along line A-A of FIG. 4.

FIG. 5b illustrates schematically a second option for the coupling 128, i.e. a form locking between the shaft 120 and the second rotating slide ring as a section A-A of FIG. 4. Here it is shown that the coupling means 128 are rectangular ridges 164 on the shaft in front of the shoulder 126'. The shape of the ridges may be whatever suitable for the purpose. In other words, it may be triangular or round as long as it clearly extends out of the shaft surface. Also the number of ridges 164 may be whatever considered appropriate, i.e. starting from one. The ridges 164 may extend radially outwardly from the surface of the shaft in front of the coupling area as shown in FIG. 5b by reference numeral 162, or the ridges may have a base circumferential surface at a somewhat larger radius than the radius of the shaft 120 in front of the coupling area (circle 162). Naturally also in this case, for establishing a proper coupling or form-locking between the second rotating slide ring and the shaft 120, the inner circumferential surface of the second rotating slide ring has to include a configuration complementing that in the outer circumferential surface of the coupling or form-locking area of the shaft.

As to the other couplings, i.e. the coupling 136 between the second stationary slide ring 114 and the pump housing and the coupling 152 between the first rotating slide ring 110 and the hub 144 of the impeller 142, the coupling alternatives discussed above are applicable, too, as well as any other appropriate type of form locking.

Figure 6:
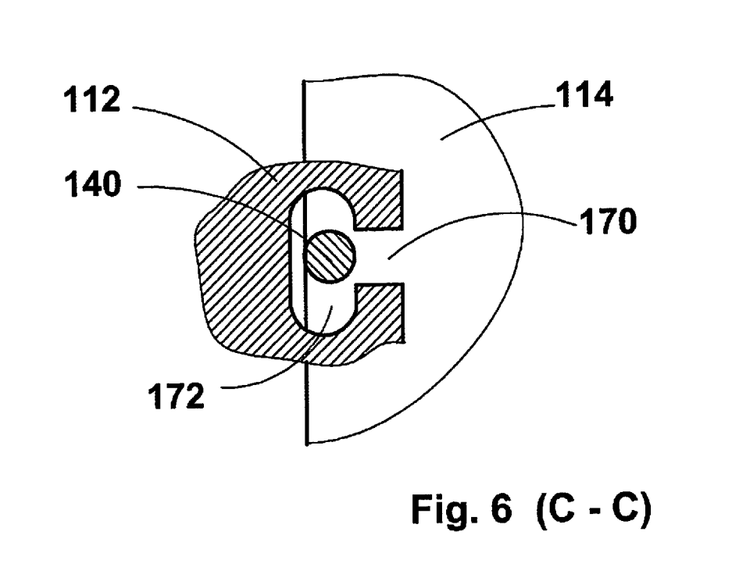
FIG. 6 illustrates schematically a partial cross section of an optional coupling between the stationary slide rings of the double mechanical seal taken along line C-C of FIG. 4.

FIG. 6 illustrates schematically as a section C-C of FIG. 4 one alternative for locking the first and the second stationary slide rings, 112 and 114 respectively, to one another. As shown in FIG. 6 and as briefly mentioned already in connection with FIG. 4 the second stationary slide ring 114 includes at least one radially inwardly extending pin 140. For the at least one pin 140 the first stationary slide ring 112 includes at least one substantially axial slot 170 and a circumferential oblong opening 172. The locking functions such that when assembling the first and second stationary slide rings to one another, after the spring has been inserted therebetween, the first stationary slide ring 112 is pushed against the spring inside the second stationary slide ring 114 such that the pin 140 (or pins if there are several pins) meets the slot 170. The first rotating slide ring 112 may be rotated if needed for making the pin/s find the slot/s. When the pin/s 140 has/have first entered the slot/s 170 and then the oblong opening/s 172 the first rotating slide ring 112 may be rotated such that the pin/s 140 reach/es one end of the oblong opening/s 172, whereby the two slide rings 112 and 114 are locked to one another such that the spring between the rings cannot push them apart. Naturally, it is clear that the oblong opening/s need not be two sided i.e. extend from both circumferential sides of the slot/s 170, but the opening 172 may extend to only one side of the slot 170. As to the opening it has to be understood that its diameter at its end area is larger than that of the pin such that the stationary seal rings have some freeness in axial direction, i.e. the rings may move in axial direction for compensating the wear of the slide surfaces.

Figure 7:
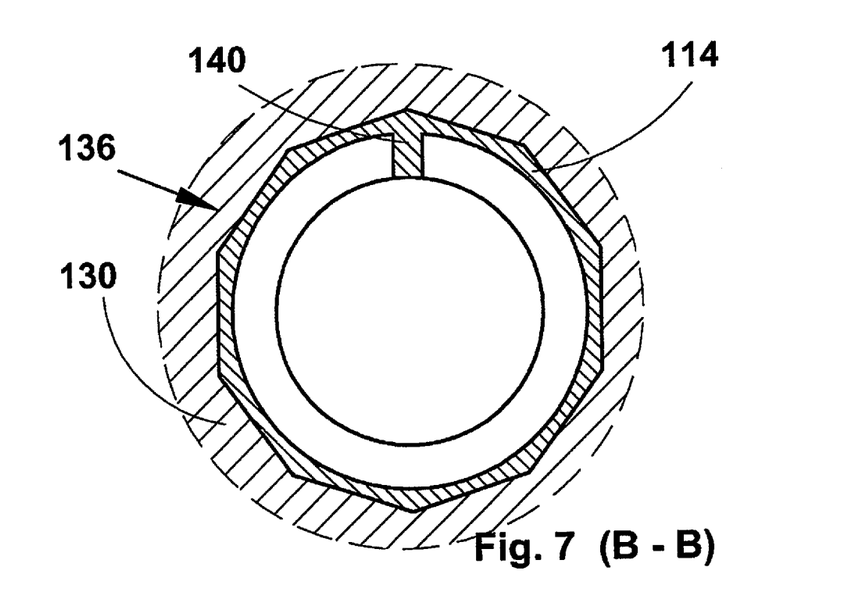
FIG. 7 illustrates schematically a cross section of a coupling between the pump housing and the second stationary slide ring of a double mechanical seal taken along line B-B of FIG. 4, FIGS. 8a-8d illustrate enlarged cross sectional views of the slide rings of FIG. 4.

FIG. 7 illustrates schematically as a section B-B of FIG. 4 both the locking pin 140 of FIG. 6 and one alternative for the cross section of the second stationary slide ring 114 used at coupling or form-locking 136. In other words, now the outer circumferential surface of the second stationary slide ring 114 is formed of a polygon having ten planar sides.

Naturally, also the pump housing 130, i.e. the bore surrounding the second stationary slide ring 114 is disposed at its inner peripheral surface with a corresponding but complementing polygonal cross section.

Figure 8A:
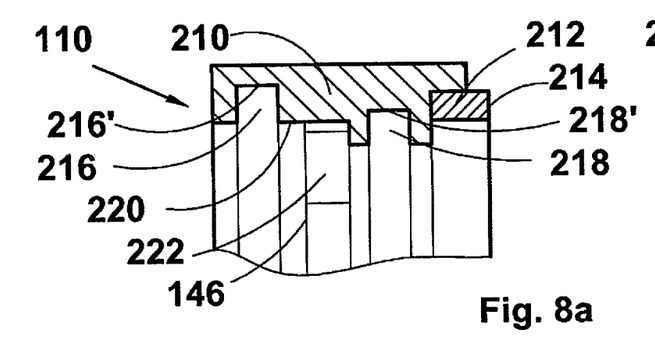

FIG. 8a illustrates an enlarged cross sectional view of the first rotating slide ring 110 of FIG. 4. The first rotating slide ring 110 comprises as already mentioned earlier a body part 210 and a sliding member 212. The two parts are, for instance, shrink fitted to one another. However, it is possible to manufacture the entire ring 110 of the same material, i.e. the material of the sliding member 212. The first rotating slide ring 110 is a lengthy sleeve like object that has at its one axial end a slide or seal surface 214, and, in this embodiment, two circumferential grooves 216 and 218 at its inner circumferential surface 220 for seal rings, for instance O-rings. However, it has to be understood that, when only one seal ring is used, the groove 216 is the groove needed for such a single seal ring. The slide or seal surface 214 is normally radial, but it is also possible to incline the surface. Between the grooves 216 and 218 the inner surface 220 has a shoulder 146 and at one side of the shoulder 146 the means 222 for form locking the first rotating slide ring 110 on the outer peripheral surface of the hub of the rotor of the flow machine. The shape of the applicable form-locking means 222 has been discussed already above, however, without any intention to limit the configuration of the form-locking means to the discussed ones. As to the grooves for the seal rings, they are not necessarily in the inner peripheral surface 214 of the first rotating slide ring 110, but one or both corresponding groove/grooves may be located, as mentioned already above, one (the only one, if a single seal ring is used) on the hub of the rotor and the other on the shaft of the flow machine, if desired. In both cases it may be said, in more general terms, that the inner circumferential surface of the slide ring has a sealing surface 216' (and 218', if both seal rings are used) for the seal ring, i.e. a surface facing the hub or the shaft and being in communication with the seal ring when the seal has been assembled on the shaft and/or the hub. In FIG. 8a the sealing surfaces 216' and 218' are the bottom surfaces of the grooves 216 and 218. The sealing surfaces are here located at both sides of the form-locking means.

Figure 8B:
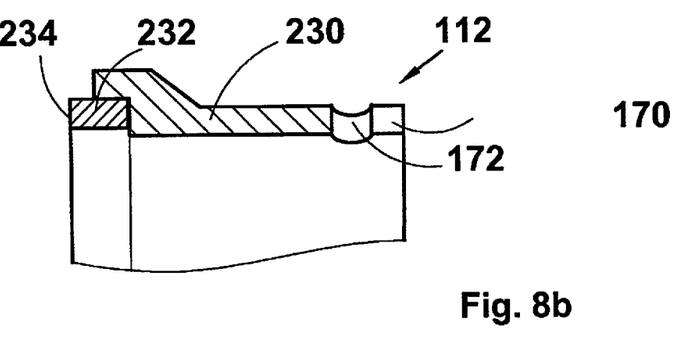

FIG. 8b illustrates an enlarged cross sectional view of the first stationary slide ring 112 of FIG. 4. The first stationary slide ring 112 comprises a body part 230 and a sliding member 232. The two parts are, for instance, shrink fitted to one another. However, it is possible to manufacture the entire ring 112 of the same material, i.e. the material of the sliding member 232. The first stationary slide ring 112 is a lengthy sleeve like object that has at its one axial end a slide or seal surface 234, and at its end opposite the slide surface an axial slot 170 and a circumferential oblong opening 172 for coupling the first and second stationary slide rings to one another. The slide or seal surface 234 is normally radial, but it is also possible to incline the surface as long as its counterpart, i.e. the slide or seal surface 214 of the rotating ring 110 has a complementing inclination. As mentioned already earlier the outer circumferential surface of the first stationary slide ring 112 may include a circumferential groove for sealing means in place of the groove and sealing means 138 of FIG. 4 arranged in the wall of the bore 132. In any case, the outer circumference of the first stationary slide ring 112 includes a sealing surface cooperating with the seal ring after the shaft and the sealing have been assembled in the pump housing 130.

Figure 8C:
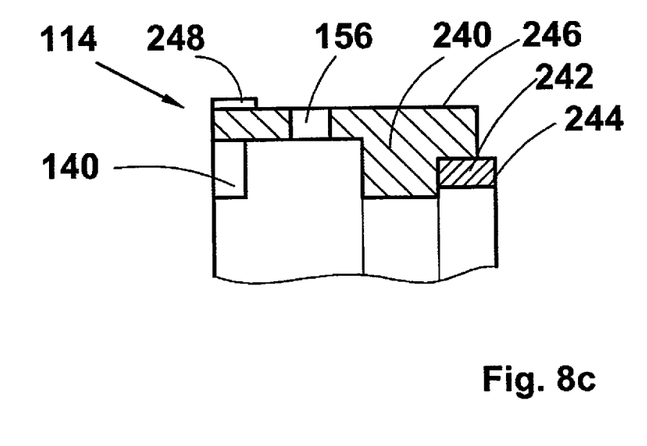

FIG. 8c illustrates an enlarged cross sectional view of the second stationary slide ring 114 of FIG. 4. The second stationary slide ring 114 comprises a body part 240 and a sliding member 242. The two parts are, for instance, shrink fitted to one another. However, it is possible to manufacture the entire ring 114 of the same material, i.e. the material of the sliding member 242. The second stationary slide ring 114 is a lengthy sleeve like object that has at its one axial end a slide or seal surface 244, and at its end opposite the slide surface 244 at least one radially inwardly extending pin 140 for coupling the first and second stationary slide rings to one another by communicating with the at least one slot and opening in the first stationary slide ring shown in FIG. 8b. The slide or seal surface 244 is normally radial, but it is also possible to incline the surface. The outer circumferential surface of the second stationary slide ring 114 may include a circumferential groove for sealing means in place of the groove and sealing means 134 of FIG. 4 arranged in the wall of the bore 132. In any case, the outer circumference of the second stationary slide ring 114 includes a sealing surface cooperating with the seal ring after the shaft and the sealing have been assembled in the pump housing 130.

The outer circumferential surface 246 of the second stationary slide ring 114 includes a means or device 248 for form locking the second stationary slide ring 114 to the bore for the shaft of the flow machine, the bore being disposed in the housing of the flow machine. The construction and shape of the form locking means 248 have been discussed in detail earlier. The second stationary slide ring 114 also includes an opening 156 for introducing flushing liquid to the space between the mechanical seal and the shaft of the flow machine.

Figure 8D:
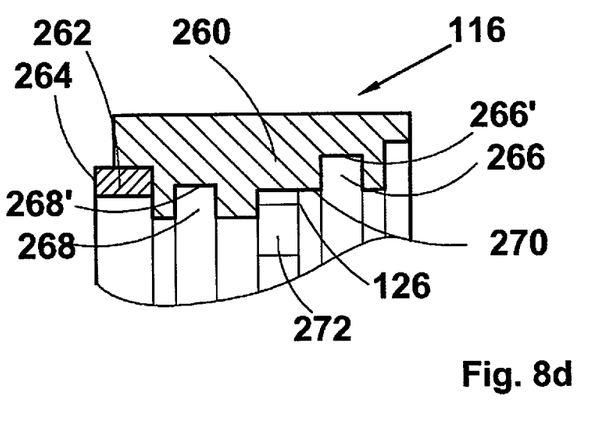

FIG. 8d illustrates an enlarged cross sectional view of the second rotating slide ring 116 of FIG. 4. The second rotating slide ring 116 comprises a body part 260 and a sliding member 262. The two parts are, for instance, shrink fitted to one another. However, it is possible to manufacture the entire ring 116 of the same material, i.e. the material of the sliding member 262. The second rotating slide ring 116 is a lengthy sleeve like object that has at its one axial end a slide or seal surface 264, and, in this embodiment, two circumferential grooves 266 and 268 at its inner circumferential surface 270 for seal rings, for instance O-rings. However, it has to be understood that, when only one seal ring is used, the groove 266 is the groove needed for such a single seal ring. The slide or seal surface 264 is normally radial, but it is also possible to incline the surface as long as its counterpart, i.e. the slide or seal surface 244 of the second stationary ring 114 has a complementing inclination. Between the grooves 266 and 268 the inner circumferential surface 270 has a shoulder 126 and at one side of the shoulder 126 the means or device 272 for form locking the second rotating slide ring 116 on the shaft of the flow machine. The applicable shape of the form locking means 272 has been discussed already above, however, without any intention to limit the configuration of the form-locking means to the discussed ones. As to the grooves for the seal rings, they are not necessarily in the inner circumferential surface 270 of the second rotating slide ring 116, but one or both corresponding groove/grooves may be located, as discussed already earlier, on the shaft of the flow machine, if desired. In both cases it may be said, in more general terms, that the inner circumferential surface of the slide ring has a sealing surface 266' (and 268', if both seal rings are used) for the seal ring, i.e. a surface facing the hub or the shaft and being in communication with the seal ring when the seal has been assembled on the shaft and/or the hub. In FIG. 8a the sealing surfaces 266' and 268' are the bottom surfaces of the grooves 266 and 268. The sealing surfaces are here located at both sides of the form-locking means.

Figure 9A:
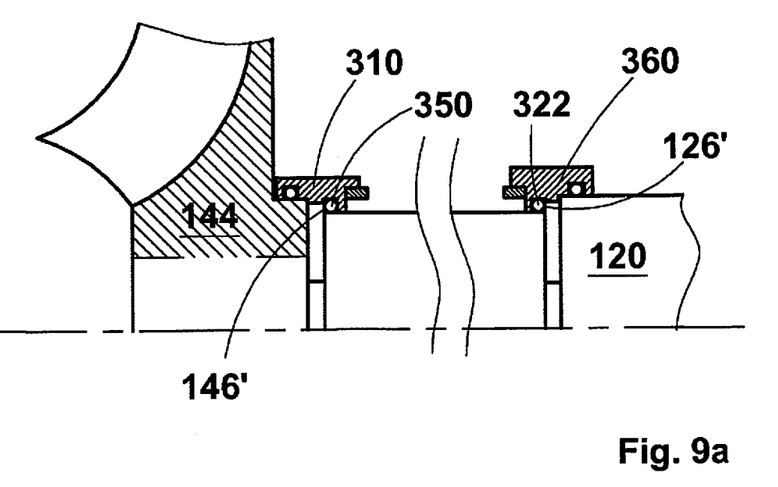
FIG. 9a is a schematical partial cross section of a centrifugal pump, the shaft of the centrifugal pump carrying rotating slide rings in accordance with a second preferred embodiment of the present invention.

FIG. 9a is a partial illustration of a double mechanical seal in accordance with a second preferred embodiment of the present invention. FIG. 9a shows the shaft 120 and the impeller hub 144 of a centrifugal pump and the first and the second rotating slide rings 310 and 360 arranged on the hub 144 and on the shaft 120.

The difference between the first embodiment and the second embodiment may be seen in the way the rotating slide rings are supported in axial direction. In the first embodiment the rotating slide rings 110 and 116 are resting axially against shoulders 146' and 126' found at the hub 144 and at the shaft 120 in FIG. 4. In other words, the slide rings itself are resting against the shoulders. In the second embodiment the slide rings 310 and 360 include seal rings 350 and 322 via which the rotating slide rings 310 and 360 are arranged to rest against the shoulders 146' and 126' of the hub 144 and the shaft 120, respectively.

Figure 9B:
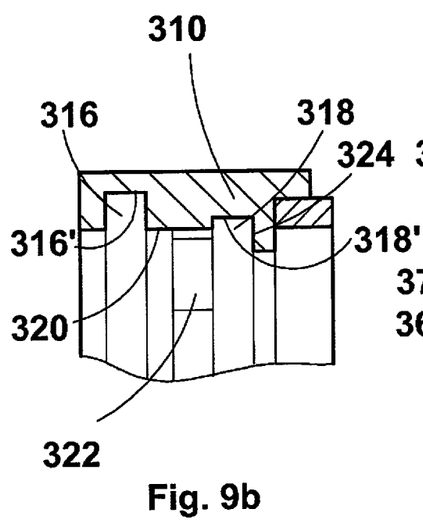
FIGS. 9b and 9c illustrate enlarged cross sectional views of the slide rings of FIG. 9a, FIG. 10a is a schematical partial cross section of a centrifugal pump, the shaft of the centrifugal pump carrying rotating slide rings in accordance with a third preferred embodiment of the present invention.
Figure 9C:
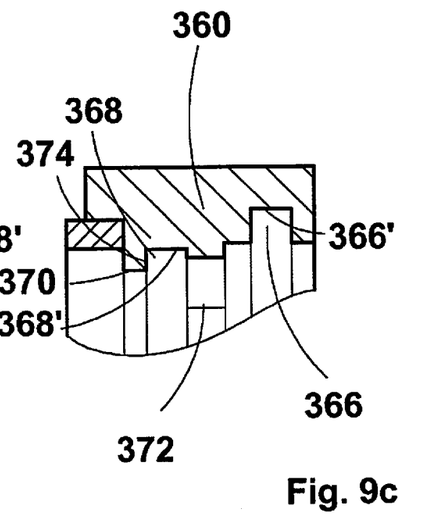

FIGS. 9b and 9c illustrate the structure of the first and the second rotating slide rings 310 and 360 in more detail. The structure of the slide rings is very close to the one of the earlier embodiment. Now the only difference may be seen at the inner circumferential surfaces 320 and 370 of the slide rings 310 and 360 in the depth of the grooves 318 and 368 in relation to the form-locking means or device 322 and 372. Now that the seal rings 350, 322, preferably but not necessarily O-rings, are arranged to be positioned, when the slide rings 310, 360 are installed or assembled on the shaft 120, between the shoulders 324, 374 on the inner circumference of the slide rings 310, 360 and the shoulders 146', 126' of the hub 144 and the shaft 120, respectively, the depth of the groove 318, 368 is needed only for keeping the seal rings 350, 322 in their positions during the assembly of the slide rings 310, 360 on the shaft 120. Again, as also in the earlier embodiment, the seal rings may be arranged in corresponding shallow grooves on the shaft such that when the slide rings are assembled on the shaft the seal rings are pressed between the slide rings and the shoulders. In both cases it may be said, in more general terms, that the inner circumferential surfaces 320 and 370 of the slide rings 310 and 360 have sealing surfaces 316' and 366' (and 318' and 368", if both seal rings are used) for the seal rings, i.e. surfaces facing the hub and/or the shaft and being in communication with the seal rings when the seal has been assembled on the shaft and/or the hub. In FIGS. 9b and 9c the sealing surfaces 316', 318', 366' and 368' are the bottom surfaces of the grooves 316, 318, 366 and 368. The sealing surfaces are here located at both sides of the form-locking means 322 and 372.

Figure 10A:
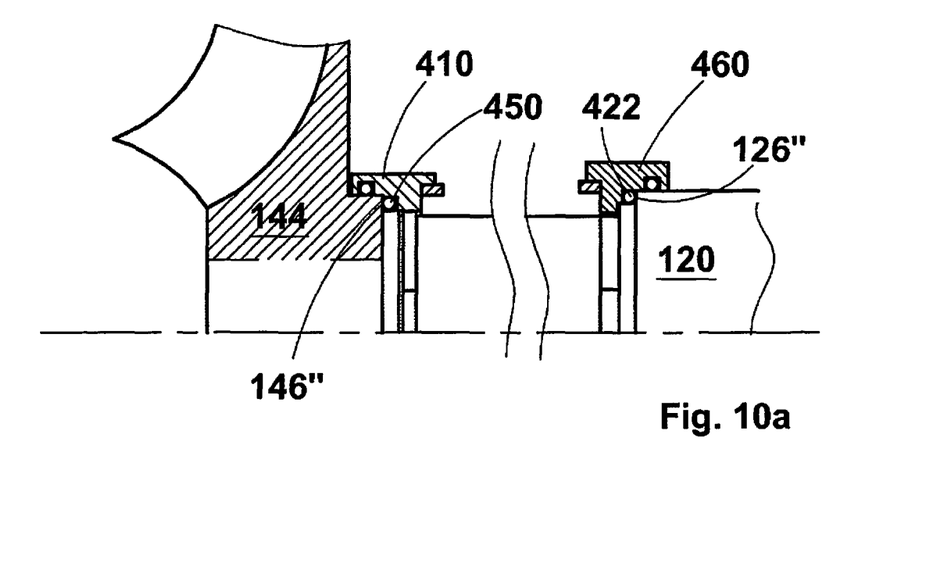

FIG. 10a is a partial illustration of a double mechanical seal in accordance with a third preferred embodiment of the present invention. FIG. 10a shows the shaft 120 and the impeller hub 144 of a centrifugal pump and the first and the second rotating slide rings 410 and 460 arranged on the hub 144 and on the shaft 120.

The difference between the first embodiment and the third embodiment may be seen in the way the rotating slide rings are supported in axial direction. In the first embodiment the rotating slide rings 110 and 116 are resting axially against shoulders 146' and 126' found at the hub 144 and at the shaft 120 in FIG. 4. In the third embodiment the seal rings 450 and 422 of the rotating slide rings are arranged to rest against the shoulders 146" and 126" of the hub 144 and the shaft 120, respectively.

Figures 10B, 10C:
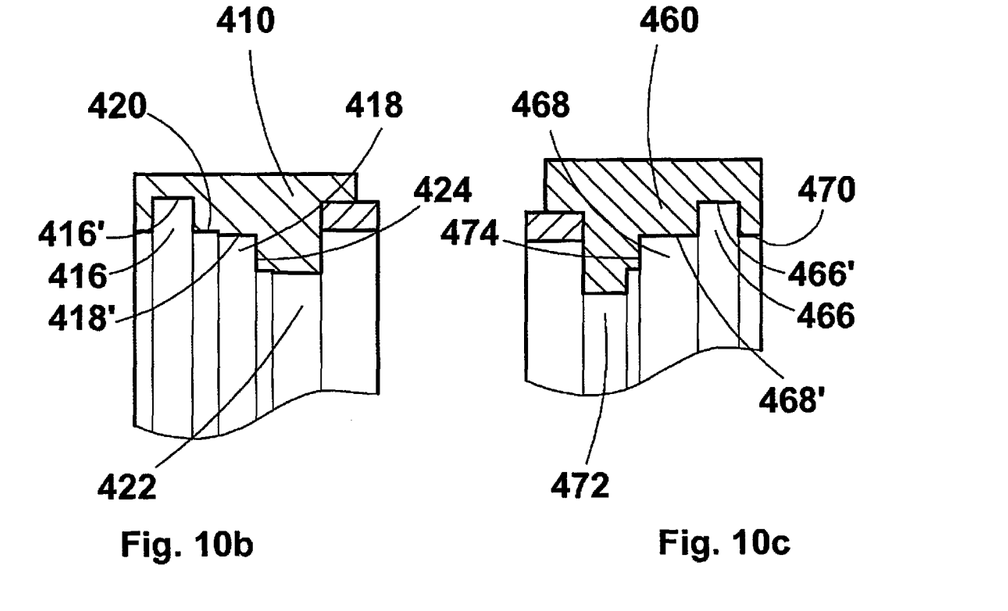
FIGS. 10b and 10c illustrate enlarged cross sectional views of the slide rings of FIG. 10a, and FIGS. 11a and 11b illustrate two preferred embodiments for the novel construction of a single mechanical seal.

FIGS. 10b and 10c illustrate the structure of the first and the second rotating slide rings 410 and 460 in more detail.

The structure of the slide rings is very close to the one of the earlier embodiments. Now the main difference may be seen in the positioning of the grooves 418 and 468 at the inner circumferential surfaces 420 and 470 of the slide rings 410 and 460, respectively, in relation to the form-locking means or device 422 and 472. The grooves 418 and 468 are provided in the inner circumferential surfaces 420 and 470 of the slide rings for the seal rings 450 and 422, respectively. Now that the seal rings 450, 422, preferably but not necessarily O-rings, are arranged to be positioned, when the slide rings 410, 460 are installed on the shaft 120, between the shoulders 424, 474 on the inner circumference of the slide rings 410, 460 and the shoulders 146", 126" of the hub 144 and the shaft 120, respectively, the grooves 418, 468 are at the same side of the form-locking means 422 and 472 when compared to the earlier embodiment of FIGS. 9a-9c. Again, as also in the earlier embodiment, the seal rings 450 and 422 may be arranged in corresponding shallow grooves on the shaft such that when the slide rings are assembled on the shaft/hub the seal rings are pressed between the slide rings and the shoulders. In both cases it may be said, in more general terms, that the inner circumferential surfaces 420 and 470 of the slide rings 410 and 460 have sealing surfaces 416' and 466' (and 418' and 468", if both seal rings are used) for the seal rings, i.e. surfaces facing the hub and/or the shaft and being in communication with the seal rings when the seal has been assembled on the shaft and/or the hub. In FIGS. 10b and 10c the sealing surfaces 416', 418', 466' and 468' are the bottom surfaces of the grooves 416, 418, 466 and 468. The sealing surfaces are here located both at one side of the form-locking means 322 and 372.

An advantage of supporting the rotating slide rings in the manner described above in FIGS. 9a-10c is that the seal rings, preferably O-rings, take the axial load subjected to the slide rings whereby the small angular deflections in the orientation of the slide rings caused by bending of the shaft, for instance, may be absorbed by the seal rings such that no excessive loads are subjected to the slide rings. To make this kind of an operation possible it is clear that small axial gaps have to be left between the slide rings 310/410 and the hub 144 such that the seal ring 350/450 has room to be compressed in axial direction. In a similar manner small gaps have to be left between the slide rings 360/460 and the shoulder on the shaft 120 such that the seal ring 322/422 has room to be compressed in axial direction.

In view of the above presented various couplings or form-locking means or device 128, 136 and 152 it has to be understood that form locking of any kind arranged between a shaft and a member coupled thereon capable of preventing rotation of a member on the shaft may be applied. In this context the form locking is understood as coupling between two elements by direct mechanical contact between the elements, i.e. without any separate pins or keys. It has to be understood, too, that the use of form locking may be used not only in connection with coupling slide rings of a double mechanical seal but also coupling rings of a single mechanical seal. Thus, as a fourth preferred embodiment of the present invention the left hand side slide ring pair of FIG. 4 may be considered as a single mechanical seal as shown in FIGS. 11a and 11b.

Figure 11A:
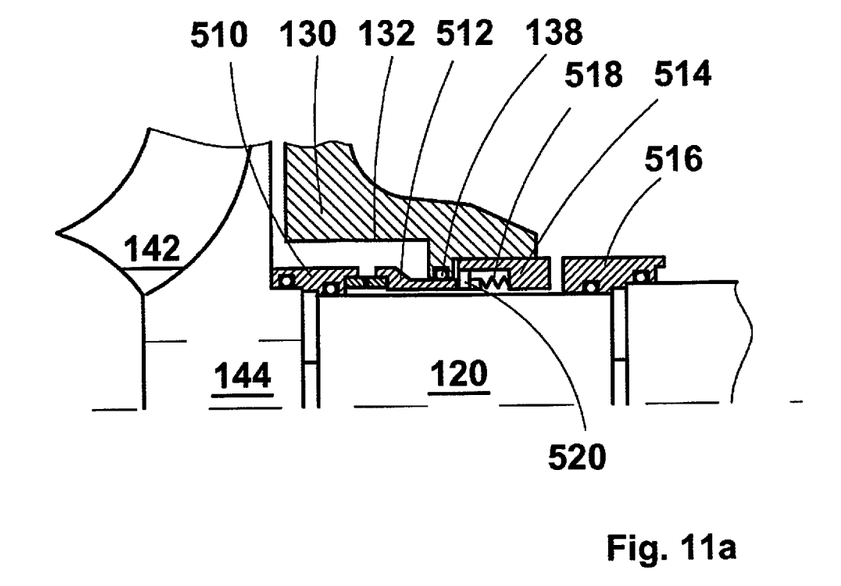

FIG. 11a illustrates a single mechanical seal in accordance with a first preferred embodiment of the present invention. As mentioned above the single mechanical seal of the invention is basically similar to the left hand side seal of the double mechanical seal of FIG. 4. In other words, the single mechanical seal comprises a rotating slide ring 510 supported on the hub 144 and on the shaft 120 by sealing means or device, preferably O-rings, a stationary slide ring 512 supported within the bore 132 of the housing 130 by an O-ring 138, a spring 518, and a backing ring 514. The backing ring 514 is fastened to the housing 130. In other words, it may include an external thread matching to an internal thread on the surface of the bore 132 or it may be screwed or bolted to the housing 130 by more or less radial screws. The backing ring has a radially inwardly extending part against which one end of the spring 518 rests. The opposite end of the spring rests against an end surface of the stationary slide ring 512. The very same end of the stationary slide ring 512 includes at least one slot and an opening for at least one pin 520 extending radially inwardly from the backing ring 514. Thus, the rotating and stationary slide rings 510 and 512, may be similar to the rings discussed in FIGS. 8a and 8b. Also the coupling of the stationary slide ring 512 to the backing ring 514 is similar to that discussed in connection with FIG. 6. The single mechanical seal of FIG. 11a may include a deflector ring 516, which is arranged on the shaft 120 by O-rings, i.e. in a manner similar to the second rotating slide ring 516 of FIG. 4. The purpose of the deflector ring is to protect the bearings of the pump or flow machine from the possibility of leaking liquid. In other words the rotating ring throws the liquid radially outwards whereby the liquid is not able to flow to the bearings and cause a bearing failure.

Figure 11B:
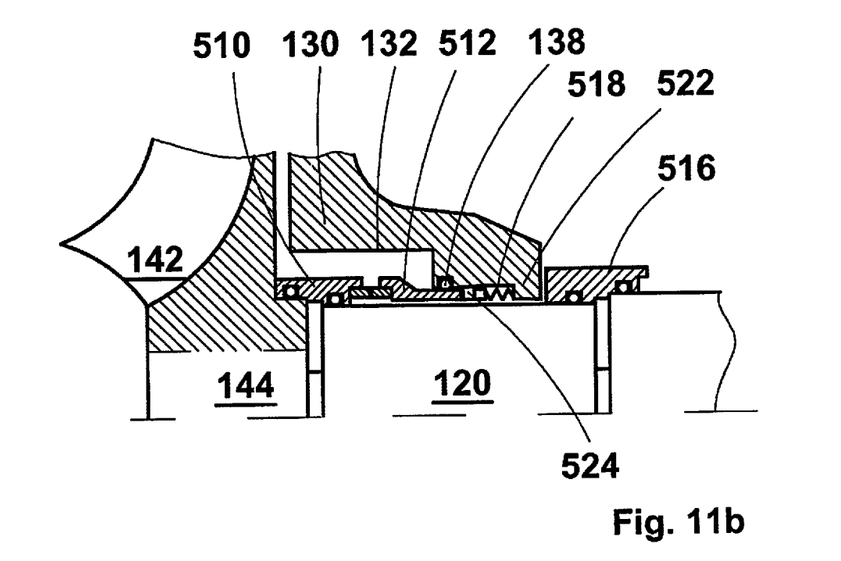

FIG. 11b illustrates a single mechanical seal in accordance with a fourth preferred embodiment of the present invention. In fact the single mechanical seal of FIG. 11b is similar to that in FIG. 11a except for the fact that the backing ring 514 of FIG. 11a is replaced with a radially inward extension 522 in the bore 132 of the housing 130. The radial extension 522 eliminates one separate ring with the threads or screws/bolts needed for fastening the ring. Also at least one pin 524 cooperating with the at least one slot and the at least one opening in the stationary slide ring 512 is disposed in the wall of the bore 132 for form locking the stationary slide ring within the bore 132.

It should also be understood that the single mechanical seal may also be built by using the second and third embodiments of the present invention as starting points, i.e. arranging the axial support of the slide ring by a seal ring between substantially radial shoulders on both the slide ring and the hub of the rotor.

As may be seen from the above description it has been possible to develop a slide ring seal, which is very simple of its construction yet capable performing its task as well as any other much more complicated mechanical seal. The mechanical seal of the present invention is less expensive and requires less space than the prior art seals. For those reasons it is possible to take double mechanical seal into use in all applications where gland packing type seals or single mechanical seals are used. The risk of choosing a wrong seal as it is the most cost-effective is now obviated. While the present invention has been herein described by way of examples in connection with what are at present considered to be the most preferred embodiments, it is to be understood that the invention is not limited to the disclosed embodiments, but is intended to cover various combinations and/or modifications of its features and other applications within the scope of the invention as defined in the appended claims. With regard to the appended claims it has to be understood that the claims use a word 'housing' by which all elements, parts, casings or casing covers, generally understood as points of application, to which the slide ring seal is to be fastened are covered.

The invention claimed is:

1. A mechanical seal comprising:
   at least one pair of slide rings, each slide ring having an outer circumferential surface, an inner circumferential surface and slide or seal surfaces at one axial end;
   a spring,
   each pair of slide rings having a rotating slide ring and a stationary slide ring, the slide or seal surfaces of each pair of slide rings being configured to be in sliding and sealing contact with each other,
   the inner circumferential surface of at least one rotating slide ring having a first shape complementing an outer circumferential surface of one of a hub of a flow machine and a shaft of the flow machine and configured to form lock the at least one rotating slide ring by direct mechanical contact to one of the hub and the shaft, and at least one sealing surface at a side of the first shape,
   each of the rotating slide rings, when assembled to the flow machine, being supported in an axial direction by a seal ring to one of the hub and the shaft of the flow machine.

2. The mechanical seal as recited in claim 1, wherein the seal ring is arranged, when assembled to the flow machine, on the sealing surface between the rotating slide ring and one of the shaft and the hub of the flow machine so as to float the rotating slide ring on the shaft or on the hub.

3. The mechanical seal as recited in claim 2, further comprising
   a groove for the seal ring in at least one of the rotating slide ring, the shaft and the hub.

4. The mechanical seal as recited in claim 2, wherein the seal ring is an O-ring or lip seal.

5. The mechanical seal as recited in claim 2, wherein the mechanical seal is a single mechanical seal or a double mechanical seal.

6. A flow machine comprising the mechanical seal as recited in claim 2.

7. The mechanical seal as recited in claim 1, further comprising
   a shoulder on the inner circumferential surface of the rotating slide ring and a cooperating shoulder on at least one of the shaft and the hub, and, when assembled to the flow machine, the seal ring is arranged between the shoulders to support the rotating slide ring in the axial direction on at least one of the shaft and the hub.

8. The mechanical seal as recited in claim 7, further comprising
   a groove for the seal ring in at least one of the rotating slide ring, the shaft and the hub.

9. The mechanical seal as recited in claim 7, wherein the seal ring is an O-ring or lip seal.

10. The mechanical seal as recited in claim 7, wherein the mechanical seal is a single mechanical seal or a double mechanical seal.

11. A flow machine comprising the mechanical seal as recited in claim 7.

12. A flow machine comprising the mechanical seal as recited in claim 1.

13. The mechanical seal as recited in claim 1, further comprising
   a groove for the seal ring in at least one of the rotating slide ring, the shaft and the hub.

14. The mechanical seal as recited in claim 13, wherein the seal ring is an O-ring or lip seal.

15. The mechanical seal as recited in claim 13, wherein the mechanical seal is a single mechanical seal or a double mechanical seal.

16. A flow machine comprising the mechanical seal as recited in claim 13.

17. The mechanical seal as recited in claim 1, wherein the seal ring is an O-ring or lip seal.

18. The mechanical seal as recited in claim 17, wherein the mechanical seal is a single mechanical seal or a double mechanical seal.

19. A flow machine comprising the mechanical seal as recited in claim 17.

20. The mechanical seal as recited in claim 1, wherein the mechanical seal is a single mechanical seal or a double mechanical seal.

21. The mechanical seal as recited in claim 1, wherein the inner circumferential surface of the at least one rotating slide ring is disposed on the at least one of the hub and the shaft.

22. The mechanical seal as recited in claim 1, wherein the outer circumferential surface of the one of the hub of the flow machine and the shaft of the flow machine has at least a portion deviating from a generally circular surface.

* * * * *